United States Patent [19]

Brown et al.

[11] Patent Number: 4,892,256
[45] Date of Patent: Jan. 9, 1990

[54] UP-SPRAY DEFLECTOR CUP FOR SPRAYING THE UNDERSIDE OF PLANT FOLIAGE

[75] Inventors: Richard D. Brown, Glendora; Doyle R. Metz, Ontario; Roger W. Perkins, Glendora, all of Calif.

[73] Assignee: Rain Bird Sprinkler Mfg. Corp., Glendora, Calif.

[21] Appl. No.: 239,796

[22] Filed: Sep. 1, 1988

[51] Int. Cl.$^4$ .................... B05B 1/26; A01G 25/09
[52] U.S. Cl. ......................... 239/734; 239/524
[58] Field of Search ............ 239/726, 734, 524, 498, 239/DIG. 1, 169, 160, 161–168

[56] References Cited

U.S. PATENT DOCUMENTS

| | | | |
|---|---|---|---|
| 4,405,085 | 9/1983 | Moyer | 239/726 |
| 4,676,438 | 6/1987 | Sesser | 239/524 X |
| 4,728,040 | 3/1988 | Healy et al. | 239/524 X |
| 4,795,100 | 1/1989 | Purtell et al. | 239/734 |

FOREIGN PATENT DOCUMENTS 18402 of 1908 United Kingdom ............ 239/498

Primary Examiner—Andres Kashnikow
Assistant Examiner—Kevin P. Weldon
Attorney, Agent, or Firm—Kelly, Bauersfeld & Lowry

[57] ABSTRACT

An up-spray deflector cup for use in an irrigation device of the type suspended from an overhead traveling irrigation system for discharging water from a downwardly directed nozzle in close proximity to the ground, the deflector cup being positioned centrally below the nozzle and serving to deflect water from the nozzle upwardly and radially outwardly as diametrically opposed from choped sprays. The deflector cup includes two concentric sets of deflecting surfaces for deflecting water from different size nozzles risible with the irrigation device.

8 Claims, 2 Drawing Sheets

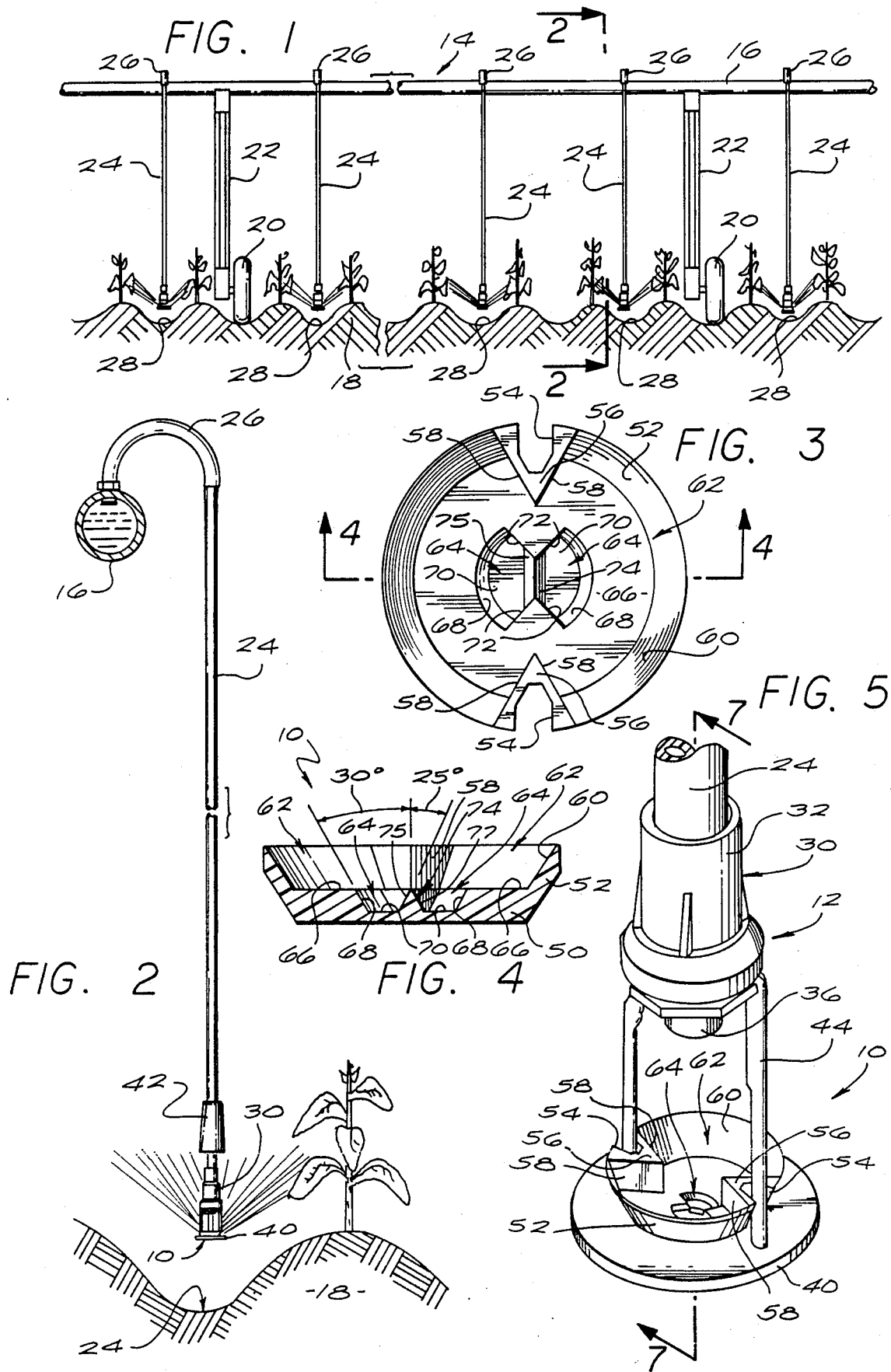

UP-SPRAY DEFLECTOR CUP FOR SPRAYING THE UNDERSIDE OF PLANT FOLIAGE

BACKGROUND OF THE INVENTION

This invention relates to irrigation devices for delivering water and pesticides to agricultural crops and the like, and more particularly, to an up-spray deflector cup primarily intended for use in permitting the water discharged from a downwardly directed nozzle near the ground to be deflected upwardly to spray the underside of the plant foliage.

In co-pending application Ser. No. 901,012 filed Sep. 22, 1986, entitled "Low Energy Irrigation Device" commonly owned by the Assignee of this application, there is disclosed an irrigation device for delivering a relatively low pressure water flow in the form of a thin, substantially bubble-like film or curtain of water for close range delivery. The irrigation device of the aforementioned co-pending application, Ser. No. 901,012 the disclosure of which is hereby incorporated by reference into this application, is primarily intended to be used for the irrigation of row crops from an overhead traveling irrigation system such as the well known center pivot and linear wheel line type system, and is specifically designed for close range release of a low pressure flow of water into diked furrows to reduce evaporation losses and undesirable windage effects, and to prevent erosion.

In its most basic form, the irrigation device of the aforementioned co-pending application is attached to the lower end of a drop tube extending downwardly from an overhead water supply conduit of the traveling irrigation system, and includes a body supporting a nozzle through which a stream of water is discharged downwardly into a pressure regulated chamber. The water discharged into the chamber, which includes a bottom, substantially horizontally disposed base, and a regulator cover relatively freely and slideably supported about the body, is collected within the chamber to produce a pressure head sufficient to float the regulator cover above the base and form a narrow substantially annular gap through which the thin bubble-like film of water is emitted. An energy absorbing element may also be provided within the chamber to dissipate the energy of the water stream emitted by the nozzle.

Typically, the irrigation device of the aforementioned co-pending application is positioned to emit its bubble-like film from a height of about four inches above the bottom of the furrow, a height well below the foliage of the crop being irrigated. As discussed in the aforementioned co-pending application, in some instances such as during the germination phase of plant irrigation, it is desirable to spray water from a height well above the ground and the crop, and in such situations, the irrigation device therein disclosed is raised to a position near the overhead supply pipe, and the regulator cover is lifted out of the way or removed such that water from the nozzle is sprayed radially outwardly in a generally annular pattern by the base, thereafter to fall as droplets onto the ground.

Thus, the irrigation device of the aforementioned co-pending application is usable for both providing an overhead spray during the germination phase of crop irrigation, and during the growth period, for providing a bubble-like, low pressure irrigation stream needed for crop growth. There is, however, a third irrigation phase for which the irrigation device of the aforementioned co-pending application has not proved totally satisfactory. That phase is the chemigation phase where various chemical pesticides are added to the irrigation water to control pest infestation.

In the chemigation phase, it is desirable to spray pesticide added irrigation water onto the foliage of the crop, and preferably to the underside of the crop foliage. For example, with a row crop such as corn, pests tend to infest the underside of the plant leaves and it typically is necessary to apply chemical pesticides to the corn crop about four times during the growth cycle. To be most effective, the pesticide added irrigation water should be applied to the underside of the foliage, rather than from above the crop, thereby to insure spraying onto the crop leaves where pests are most likely to be found.

While it is possible to use the irrigation device of the aforementioned co-pending application in the chemigation mode, such use is generally restricted to turning the irrigation device upside down and looping the drop tube back upon itself so that the irrigation device may be clipped or otherwise detached in an elevated and inverted position to the downwardly extending portion of the drop tube level with the crop to be irrigated. With this positioning of the irrigation device, the regulator cover can be removed so that the nozzle sprays upwardly onto the base, and the base in turn deflects the water radially outwardly in an annular pattern onto the crop. When used this manner, however, only a small percentage of the crop foliage is irrigated on the underside as the majority of the pesticide added water falls onto the crop from above. Further it has been found that the drop tube loop formed below the irrigation device tends to become snagged by the crop as the irrigation system moves down the rows, thereby pulling the irrigation device away from the drop tube and possibly even separating the device from the drop tube itself.

There exists, therefore, a significant need for a device that can be used to divert the water discharged from the nozzle of an irrigation device of the type disclosed in the aforementioned co-pending application in an upwardly direction for spraying pesticide added water to the underside of the crop foliage, and which permits the irrigation device to be so operated without having to invert or move the irrigation device relative to the downwardly extending drop tube. The up-spray deflector cup of the present invention fulfills this need in a novel and unobvious manner.

SUMMARY OF THE INVENTION

The present invention provides an up-spray deflector cup for use with an irrigation device of the type disclosed in the aforementioned co-pending application and which is normally intended to dispense a low pressure, low velocity bubble like film of water in close proximity to the ground, into a spray device which directs a pressurized water spray upwardly and radially outwardly from below the crop foliage being irrigated without having to invert or reposition the irrigation device. Further, the up-spray deflector cup of the present invention is constructed such that a single up-spray deflector cup can readily be used with the full range of nozzle sizes typically employed with such irrigation devices, while insuring that minimum acceptable results are obtained over normal nozzle water supply pressures.

The up-spray deflector cup has a generally cup shaped appearance with a generally circular horizontal cross section and is supported on the base plate of the irrigation device to be centered below the center line of the discharge nozzle of the irrigation device. The deflector cup is formed to have two concentric and radially spaced sets of fan shaped deflecting areas, and which function to deflect water from the nozzle upwardly and radially outwardly from the device in diametrically opposed fan shaped patterns. The radially inner and smaller sets of fan shaped deflecting areas are effective for producing sprays from small diameter nozzles, such as those having a diameter between about 0.0625 inches to 0.1719 inches in diameter, and the outer, larger fan shaped deflecting area is effective for deflecting water from larger diameter nozzles, those having diameters within the range of about 0.2188 inches to 0.4063 inches.

The up-spray deflector cup comprises a circular bottom having a generally horizontal upper face, with a peripheral side wall integrally formed with the bottom and projecting upwardly and radially outwardly therefrom. First and second pairs of vertical walls project radially inwardly from the side wall and terminate inwardly in vertical apices lying in a vertical plane diametrically through the bottom, the arcuately facing walls of each pair of vertical sides cooperating with the side wall portion extending therebetween to define a large diameter deflecting area for forming symmetrical fan shaped spray patterns on each side of the plane. Formed radially inwardly and concentrically with the large deflecting area is the small deflecting area which is formed by a downwardly and radially inwardly directed arcuate deflector wall extending from the upper face of the bottom to a second, generally horizontal bottom wall, the deflector wall being concentric with the peripheral side wall forming the large deflecting area. A pair of transition wedges is formed by a pair of vertical side walls extending radially inwardly from the deflector wall and terminating an apices lying in the vertical plane, the arcuate facing sides of the transition wedges cooperating with the deflector wall portion extending therebetween to define deflecting surfaces for forming symmetrical fan shaped sprays on each side of the plane.

To evenly divide the flow from the nozzle to each side of the plane, a splitter wedge is formed across the deflector cup along the bottom of the small deflecting area, the splitter wedge having sides sloping downwardly and outwardly from an apex lying within the plane. The splitter wedge is primarily affective during operation of an irrigation device with small size nozzles, and the transition wedges associated with the small deflecting area function to aide in directing water toward the larger wedges to augment the radius and height of water throw from those nozzles whose diameters transition between small and large, typically between 0.1719 inches to 0.2188 inches in diameter.

The up-spray deflector cup of the present invention provides an inexpensive, yet highly effective and reliable device for quickly and easily converting an irrigation device from its normal mode of operation wherein a bubble like flow is dispensed downwardly onto the ground, to a device for spraying an upwardly and radially outwardly directed fan shaped water spray so that pesticide added water can be sprayed on the underside of crop foliage such as required during the chemigation phase of irrigation. Other features and advantages of the present invention will become apparent from the following detailed description, taken in conjunction with the accompanying drawings, which illustrate, by way of example, the principles of the invention.

BRIEF DESCRIPTION OF THE DRAWINGS

FIG. 1 is a fragmentary perspective view of an overhead traveling irrigation system employing irrigation devices wherein an up-spray deflector cup of the present invention has been installed, and schematically illustrating operation of the irrigation device with the present invention;

FIG. 2 is an enlarged, fragmentary perspective view, partly in cross section, taken along the line 2—2 of FIG. 1;

FIG. 3 is a top plan view of the up-spray deflector cup of the present invention shown removed from the irrigation device;

FIG. 4 is a section view taken substantially along the line 4—4 of FIG. 3;

FIG. 5 is an enlarged fragmentary perspective view, partly in section, showing the up-spray deflector cup supported by the irrigation device;

DETAILED DESCRIPTION OF PREFERRED EMBODIMENT

Figures 6, 7:
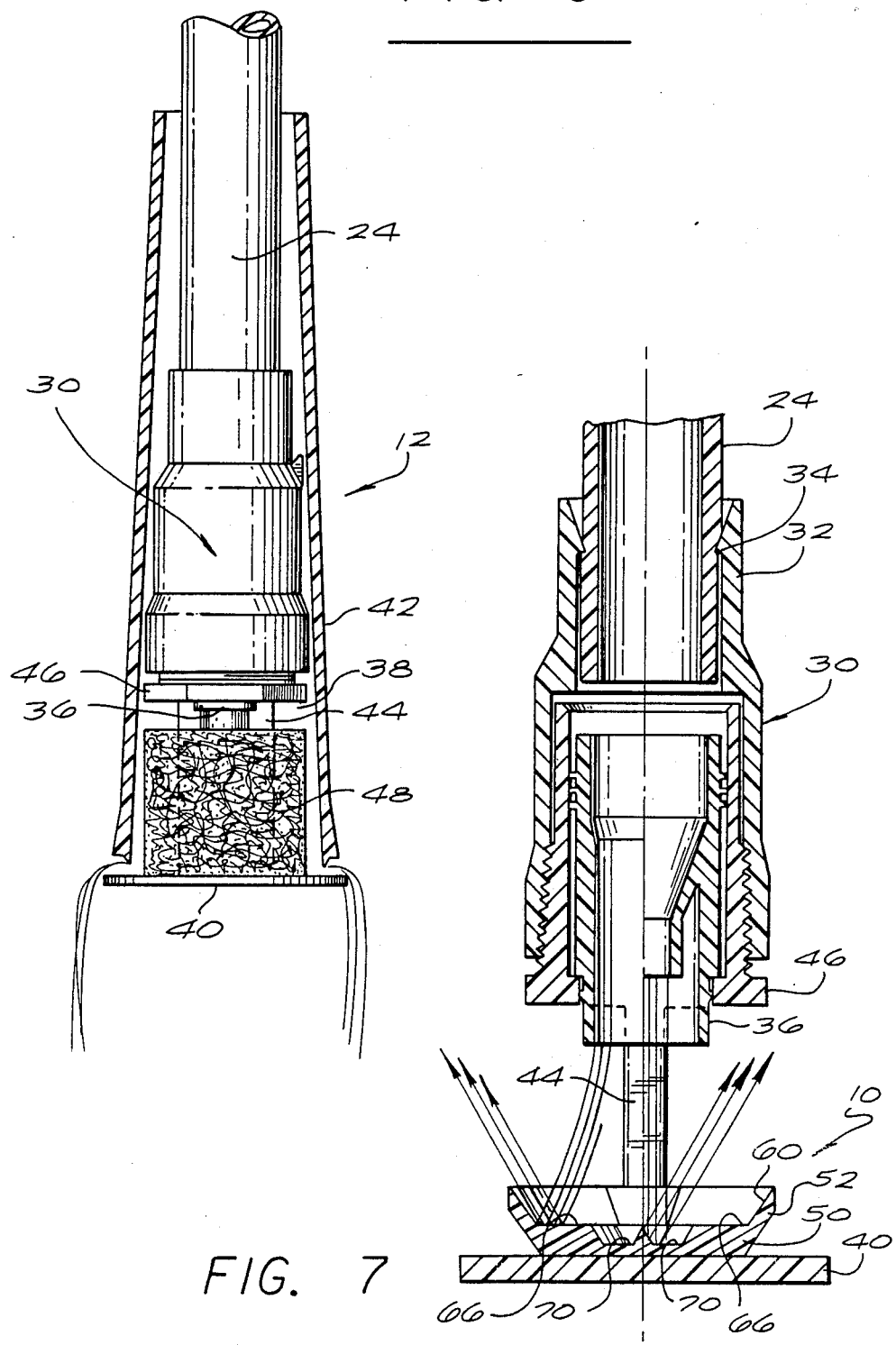
FIG. 6 is a sectional view of a prior art irrigation device as used in its normal mode of operation.
FIG. 7 is a sectional view taken substantially along the line 7—7 of FIG. 5.

As shown in the exemplary drawings, the present invention is embodied in an up-spray deflector cup 10 (best seen in FIGS. 2 through 5 and 7) primarily intended for use with an irrigation device 12 (best seen in FIG. 6) of the general type disclosed in co-pending application Ser. No. 910,012, filed Sep. 22, 1986, and commonly owned by the Assignee of the present invention. In this instance, as shown in FIG. 1 of the drawings, a plurality of irrigation devices 12 are suspended from an overhead traveling irrigation system, generally designated by reference numeral 14, such is of the conventional center pivot or linear wheel type having a horizontally disposed, relatively large diameter water supply conduit 16 supported for movement over the ground 18 by wheels 20 and struts 22. A plurality of drop tubes 24, typically flexible plastic pipes, project downwardly from rigid U-shaped couplings 26 attached to the supply conduit 16, and withdraw water from the supply conduit and direct the water downwardly to the irrigation devices 12.

The irrigation devices 12 are attached to the lower ends of the drop tubes 24 and positioned slightly above the ground 18, for example about inches above the ground, to overly the bottoms of diked furrows 28 separating the rows of crops to be irrigated. Preferably, there is one irrigation device 12 for every other furrow 28 so that one irrigation device irrigates two adjacent rows of crops as the irrigation system 14 moves over the ground 18.

With reference to FIG. 6 which illustrates more particularly a prior art irrigation device 12 of the type explained more fully in the aforementioned co-pending application, the disclosure of which is hereby incorporated herein by reference, the irrigation device comprises a generally hollow body 30, usually made of molded plastic, having an upper cylindrical connector cap portion 32 telescoped over and secured to the lower end of its associated drop tube 24, herein by a ramped annular tooth 34 compressioned fit into the drop tube, and a downwardly open nozzle 36 of selected geometry through which irrigation water is discharged. Normally, water from the nozzle 36 is discharged into a pressure regulated chamber 38 defined cooperatively by an underlying base plate 40 and a regulator cover 42 of generally truncated conical geometry supported for a relatively free sliding movement about the body 30 and along the drop tube 24.

The base plate 40 which herein is circular in horizontal cross section, is suspended below the body 30 by a pair of downwardly disposed support legs 44 which project downwardly from a threaded fitting 46 removably received in the lower end of the body. This fitting 46, which preferably is molded integrally with the support legs 44 and base plate 40 also serves to retain the nozzle 36 within the body 30 so that nozzles of varying size can be used with the irrigation device 12, the nozzle size typically used ranging from between about 0.0625 to 0.4063 inches in diameter, depending upon the water flow desired.

Typically, when in use in its normal mode of operation without the up-spray deflector cup 10 of the present invention, water is discharged from the nozzle 36 directly onto a pressure absorbing element 48 supported centrally below the nozzle on the base plate 40, the pressure absorbing element acting to dissipate a substantial portion of the water flow energy from the nozzle. As water collects within the pressure regulating chamber 38, it raises to a level sufficient to lift or float the cover 42 above the base plate 40, thereby creating a small annular gap between the cover and the base plate through which a bubble like film is emanated at low pressure and with low velocity into the furrow 28.

While the primary operational mode of the irrigation device 12 is for supplying irrigation water close to the ground as a low pressure, low velocity flow to promote plant growth, there are two other water application modes used with row crops which require higher pressure sprays. One mode is a germination mode during which it is desirable to use an overhead spray so that the water falls to the ground as droplets over a relatively wide area to promote seed germination. The other mode is a chemigation mode during which it is desirable to mix a pesticide or other chemical with the irrigation water and spray that water onto the crop foliage as the crop matures, the chemigation mode typically being needed about four times during the growth cycle of a row crop such as corn.

For use in the chemigation mode, the irrigation device 12 is typically positioned well above the ground 18 by raising the drop tube 24 up and over the top of the supply conduit 16 and securing the body 30 to the conduit. The energy absorbing element 48 is then removed and the cover 42 raised and repositioned away from the base plate 40 so that the nozzle 36 ejects its water directly onto the base plate. The base plate 40 in turn deflects the high pressure water spray radially outwardly as a spray which falls as droplets onto the crops there below.

Heretofore, for use during the chemigation mode, which requires that the pesticide laden water be sprayed directly onto as much of the foliage of the crop as possible, the irrigation devices 12 were turned upside down by forming a loop in the lower end of the drop tube 24 and attaching the body 30 of the irrigation device to the drop tube near the tops of the crop. The energy absorbing element 48 would then be removed from the body 30 and the cover 42 repositioned away from the body so that water from the nozzle 36 would be ejected upwardly against the base plate and sprayed onto the crop foliage in a generally horizontal direction from the inverted base plate.

Although use of the irrigation devices 12 in this manner during chemigation has proved somewhat successful, it has been found that the pest to be controlled, particularly when used with a crop such as corn, frequently are concentrated on the underside of the plant foliage, rather than on the upper sides, and that the pesticide laden water sprayed horizontally onto or from above the crop was not always effective in reaching these pests. Further, when using the irrigation devices 12 in inverted positions with loops formed in the drop tubes 24 and hanging down below the irrigation devices, it has been found that occasionally the loop in the drop tube would become tangled in the foliage and pull the end of the drop tube out of the body, thereby separating the irrigation device from the drop tube.

Preferably, for acceptable performance, for example when applying a pesticide to a crop such as corn, the pesticide added water should be sprayed from the irrigation device radially outwardly a minimum distance within the range of at least about 48 inches to at least about 60 inches from the irrigation device. The spray should also be directed upwardly a similar minimum distance, between about 48 inches and at least 60 inches to insure adequate coverage of the foliage being sprayed.

In accordance with the present invention, the up-spray deflector cup 10 permits the user of the irrigation device 12 to quickly and easily convert the irrigation device from a low pressure, downwardly directed bubble like flow to a high pressure spray for use in the chemigation mode without having to reposition the drop tube 24 or body 30 of the irrigation device. In accordance with another aspect of the present invention, the up-spray deflector cup 10 permits a single up-spray deflector cup to be readily and effectively used with a wide range of sizes of nozzles 36 so that acceptable performance can be achieved without requiring the user to change nozzles or use different size up-spray deflector cups for different size nozzles. Moreover, the up-spray deflector cup 10 is relatively inexpensive to manufacturer, reliable in use, and provides a means whereby a more effective and reliable application of pesticide laden water to the crop foliage can be made directly to the underside of the foliage for maximum pest control.

Toward the foregoing ends, the up-spray deflector cup 10 may be readily used with the irrigation device 12 simply by raising or removing the cover 42 from its position around the body 28, and then replacing the energy absorbing element 48 with the up-spray deflector cup so that the water stream from the nozzle 36 is ejected directly into the up-spray deflector cup. The up-spray deflector cup 10 then redirects the stream of water from the nozzle 36 radially outwardly and upwardly as a spray from substantially below the level of the foliage of the crop.

More specifically, as can best be seen in FIGS. 5 and 7, the deflector cup 10 has a circular horizontal cross section, and is supported on the base plate 40 to be centered below the center line of the nozzle 36. The deflector cup 10 has a generally horizontal bottom portion 50 integrally formed with a peripheral side wall portion 52 projecting upwardly and radially outwardly so as to have an upwardly open cup shaped appearance. To retain the deflector cup 10 in position centered below the nozzle 36, herein a pair of diametrically disposed, and radially outwardly open notches 54 are formed in the side wall portion 52 to receive and engage the legs 44 which support the base plate 40 below the body 30 of the irrigation device 12.

A pair of triangular shaped wedges 56 formed by converging vertical sides 58 project radially inwardly from the inside surface 60 of the side wall portion 52 around the notches 54 to form water confining walls which deflect water around the legs 44 to produce a sharp sided fan shaped spray from each side of the deflector cup 10 between the legs of the irrigation device 12. Preferably, when the irrigation device 12 is mounted to its drop tube 24, the legs 44 are oriented so as to be approximately aligned along the centerline of the furrow 28 through which the irrigation device is moved. In this manner, a fan-shaped spray pattern will be directed by the deflector cup 10 toward the row of crops on either side of the furrow 28.

To permit the deflector cup 10 to be used with the full range of nozzles 36 typically employed with the irrigation device 12, the deflector cup is formed with two concentric and radially spaced sets of fan-shaped deflecting areas, one set being formed on each side of an imaginary plane passing through the diametrically opposed notches 54 and support legs 44. The first, relatively large set of deflecting areas generally designated 62, will be effective for larger size nozzles 36, for example in the range of 0.2188 inches to 0.4063 inches in diameter, while the second, relatively small set of deflecting areas, generally designated 64, will be effective for smaller size nozzles, for example in the range of 0.1719 inches to 0.0625 inches in diameter.

Referring to FIGS. 3 and 4 which illustrate the deflector cup 10 removed from the irrigation device 12, it will be observed that the inside of the deflector cup is formed to be symmetrical with respect to the imaginary vertical plane extending through the notches 54. Each set of large deflecting areas 62 is defined by the arcuately extending inside surface 60 of the side wall portion 52 projecting between the radially outer ends of the vertical sides 58 of the notches 54, and a generally horizontal bottom 66 extending radially inwardly from the base of the side wall portion 52 projecting between the radially outer ends of the vertical sides 58 of the notches 54. When using large diameter nozzles 36, water from the nozzle is ejected onto the bottom 66 and then deflected radially outwardly and upwardly by the inside surface 60 of the side wall portion 52, the vertical sides 58 of the notches 54 confining the spray to a fan shaped pattern.

Each set of small deflecting areas 64 is defined by a smooth walled, arcuately extending, downwardly and radially inwardly sloping wall surface 68 disposed radially inwardly of, and axially below the inside surface 60 of the side wall portion 52, and a generally horizontal bottom surface 70. To produce a sharp sided fan-shaped spray from the small deflecting areas 64, a pair of vertically disposed sides 72 are formed at each arcuate end of the wall surfaces 68 and which converge inwardly to an apex lying in the imaginary plane through the notches 54. In addition to providing a sharp sided fan-shaped spray when the deflector cup 10 is used with small size nozzles 36, it has been found that these vertically disposed sides 72 also function as transition wedges to aid in deflecting water toward the larger wedges 56 to augment the radius and height of water throw from nozzles whose diameters are in the transition range between small and large, typically between 0.1719 inches to 0.2188 inches in diameter.

To evenly divide the water from the nozzle 36 to each set of deflecting areas 62 and 64 on either side of the imaginary plane through the notches 54, a triangular shaped splitter wedge 74 is formed across the bottom 70 of the small deflecting area 64 between the apices of the transition wedges 72, the splitter wedge herein having upwardly sloping sides 75 and 77 converging along a line disposed with the imaginary plane between the wedges 56. With this arrangement, water from the nozzle 36 will be substantially evenly diverted by the splitter wedge 74 to either side of the imaginary plane and radially outwardly toward the arcuately extending side walls 60 and 68 of the fan shaped deflecting surfaces.

In tests of an up-spray deflector cup 10 made in accordance with the present invention for use in conjunction with an irrigation device 12 of the type disclosed in the aforementioned co-pending application and commercially marketed by Rain Bird Sprinkler, Mfg. Corp. of Glendora, Calif., a deflector cup having the following dimensions was found to achieve the desired results when used with the full range of nozzles 36 typically employed with such irrigation devices: maximum diameter of inside surface 60 of the side wall portion 52—1 inch; angle of inside surface 60 of the side wall portion 52 with respect to the horizontal bottom 66—35 degrees; vertical height of the inside surface 60 of the side wall portion 52 from the bottom 66—0.145 inches; maximum diameter of arcuate wall surface 68 of the small deflecting areas 64—0.380 inches; angle of arcuate wall surface 68 from the horizontal bottom surface 70—30 degrees; vertical height of the arcuate wall surface 68 from the horizontal bottom surface 70—0.070 inches; angle between the vertical sides 58 of the wedges 56—60 degrees; angle between the vertical sides 72 of the transition wedges of the small deflecting area 64—80 degrees; angle of the upwardly and radially inwardly sloping sides 75 and 77 of the splitter wedge 74 with respect to the bottom 70—25 degrees.

The up-spray deflector cup 10 made in accordance with the forgoing dimensions was found to meet or exceed the minimum acceptable distances of throw hereinbefore described with the full range of nozzle sizes from 0.0625 inches to 0.4063 inches in diameter, and when operated at nozzle water pressures between 6 p.s.i. and 15 p.s.i., nozzle pressures typical for irrigation devices 12 of the type here involved.

From the foregoing, it should be apparent that the up-spray deflector cup 10 of the present invention provides an inexpensive, yet highly effective and reliable device for quickly and easily converting an irrigation device 12 from its normal mode of operation to a device for spraying an upwardly and radially outwardly directed fan-shaped water spray so that pesticide added water can be sprayed on the underside of crop foliage during the chemigation phase of irrigation. While a particular form of the present invention has been illustrated and described, it should also be apparent that changes and modifications therein may be made without departing from the spirit and scope of the invention defined by the following claims.

We claim:

1. For use in an irrigation device of the type intended to be suspended by a drop tube extending downwardly from an overhead traveling irrigation water supply pipe, the irrigation device including a body for connection to one end of the drop tube below the supply pipe and having a removable nozzle for discharging a stream of water downwardly therefrom, the improvement comprising:

an up-spray deflector cup of circular horizontal cross section supported by said body below said nozzle for deflecting water from said nozzle upwardly and radially outwardly from said irrigation device, said deflector cup including first means for forming a pair of symmetrical fan shaped spray patterns from diametrically opposed sides of said deflector cup, and second means for forming a second pair of symmetrical fan shaped spray patterns from diametrically opposed sides of said deflector cup, said second means being spaced radially inwardly of said first means and concentric therewith.

2. The improvement as defined in claim 1 wherein each of said first and said second means for forming said first and second fan shaped spray patterns comprise a generally horizontal bottom and an upstanding peripheral side wall, said side wall projecting upwardly and radially outwardly; and first and second pairs of vertical walls projecting radially inwardly from said side wall and terminating inwardly in apices lying in a vertical plane diametrically through said deflector cup, the arcuately facing sides of each pair of said vertical sides cooperating with the side wall portion extending therebetween to define deflecting surfaces for forming said fan shaped sprays.

3. The improvement as defined in claim 2 wherein said second means for forming said fan shaped spray pattern is disposed vertically below said first means, the upper end of said vertical walls and said peripheral side wall of said second means terminating at said bottom of said first means.

4. The improvement as defined in claim 3 further including a splitter wedge disposed diametrically across said second means and comprising individual side walls extending downwardly and radially outwardly to said bottom and apex lying in said plane.

5. An up-spray deflector cup for deflecting water from a downwardly directed nozzle upwardly and radially outwardly as a pair of oppositely directed fan shaped sprays, said deflector comprising:

a circular bottom having a generally horizontal upper face;

a peripheral side wall integrally formed with said bottom and projecting upwardly and radially outwardly therefrom; and first and second diametrically opposed pairs of vertical walls projecting radially inwardly from said side wall and terminating inwardly and vertical apices lying in a vertical plane diametrically through said bottom, the arcuately facing walls of each pair of vertical sides cooperating with the adjacent side wall portion extending therebetween to define deflecting surfaces for forming symmetrical fan shaped spray patterns on each side of said plane.

6. An up-spray deflector cup as set forth in claim 5 further including means formed in said bottom for forming a second pair of oppositely directed fan shaped sprays, said means including a downwardly and radially inwardly directed arcuate deflector wall extending from said upper face to a second generally horizontal bottom wall, said deflector wall being concentric with and radially and inwardly of said peripheral side wall; and a pair of transition wedges formed by pairs of vertical side walls extending radially inwardly from said deflector wall and terminating in apices lying in said vertical plane, the arcuately facing adjacent sides of said transition wedges cooperating with the deflector wall portion extending therebetween to define deflecting surfaces for forming symmetrical fan shaped sprays on each side of said plane.

7. An up-spray deflector cup as set forth in claim 6 further including a splitter wedge disposed diametrically across said second bottom wall, rail splitter wedge comprising a pair of downwardly and radially outwardly projecting walls extending from an apex lying in said plane to said second bottom wall.

8. For use in an irrigation device of the type intended to be suspended by a drop tube extending downwardly from an overhead traveling irrigation water supply pipe, the irrigation device including a body for connection to one end of the drop tube below the supply pipe and having a nozzle for discharging a stream of water downwardly therefrom, the improvement comprising:

a generally cup shaped up-spray deflector means supported by said body below said nozzle for receiving and deflecting water from said nozzle upwardly and radially outwardly from said irrigation device, said deflector means having a generally circular horizontal cross section with a generally horizontal bottom portion and an upwardly and radially outwardly flared side wall portion extending therefrom, and first and second pairs of arcuately spaced vertical walls projecting radially inwardly from said side wall portion and terminating inwardly in apices lying in a vertical plane diametrically through said cup shaped deflector means, the arcuately facing sides of each pair of said vertical sides cooperating with the side wall portion extending therebetween to define deflecting surfaces for forming pair of symmetrical fan shaped sprays from diametrically opposed sides of said cup-shaped deflector.

* * * * *